United States Patent [19]

Yan et al.

[11] Patent Number: 4,851,374
[45] Date of Patent: Jul. 25, 1989

[54] APPARATUS AND METHOD FOR REGENERATING COKED FLUID CRACKING CATALYST

[75] Inventors: Tsoung Y. Yan, Philadelphia; Gary J. Green, Yardley, both of Pa.

[73] Assignee: Mobil Oil Corporation, New York, N.Y.

[21] Appl. No.: 56,082

[22] Filed: May 29, 1987

[51] Int. Cl.$^4$ .................. B01J 38/36; B01J 38/34; B01J 29/38; C10G 11/18
[52] U.S. Cl. .................. 502/42; 208/113; 208/120; 208/164; 422/144; 502/43; 502/517
[58] Field of Search .................. 502/41–43; 208/164, 120

[56] References Cited

U.S. PATENT DOCUMENTS

| | | | |
|---|---|---|---|
| 2,398,739 | 4/1946 | Greensfelder et al. | 502/43 |
| 3,494,858 | 2/1970 | Luckenbach | 208/164 |
| 3,767,566 | 10/1973 | Cartwell | 208/120 |
| 3,903,016 | 9/1975 | Owen | 502/42 |
| 3,926,843 | 12/1976 | Owen | 252/417 |
| 3,970,587 | 7/1976 | Shinnar et al. | 208/164 |
| 4,115,251 | 9/1978 | Flanders et al. | 208/120 |
| 4,290,878 | 9/1981 | Blanton, Jr. | 502/42 |
| 4,325,833 | 4/1982 | Scott | 252/417 |
| 4,417,975 | 11/1983 | Myers et al. | 208/164 |
| 4,436,613 | 3/1984 | Sayles et al. | 502/42 |
| 4,471,063 | 9/1984 | Hettinger | 502/43 |

FOREIGN PATENT DOCUMENTS 2001545 2/1979 United Kingdom .

*Primary Examiner*—Paul E. Konopka
*Attorney, Agent, or Firm*—Alexander J. McKillop; Charles J. Speciale; Malcolm D. Keen

[57] ABSTRACT

A continuous regenerator for the two-stage regeneration of hot coked fluid catalytic cracking catalyst, and a method for regenerating coked catalyst by combustion with air and with reduced emissions of nitrogen oxides, or with reduced emissions of any two or more of the pollutants which include nitrogen oxides, sulfur oxides and carbon monoxide.

12 Claims, 1 Drawing Sheet

TWO-STAGE FCC REGENERATOR

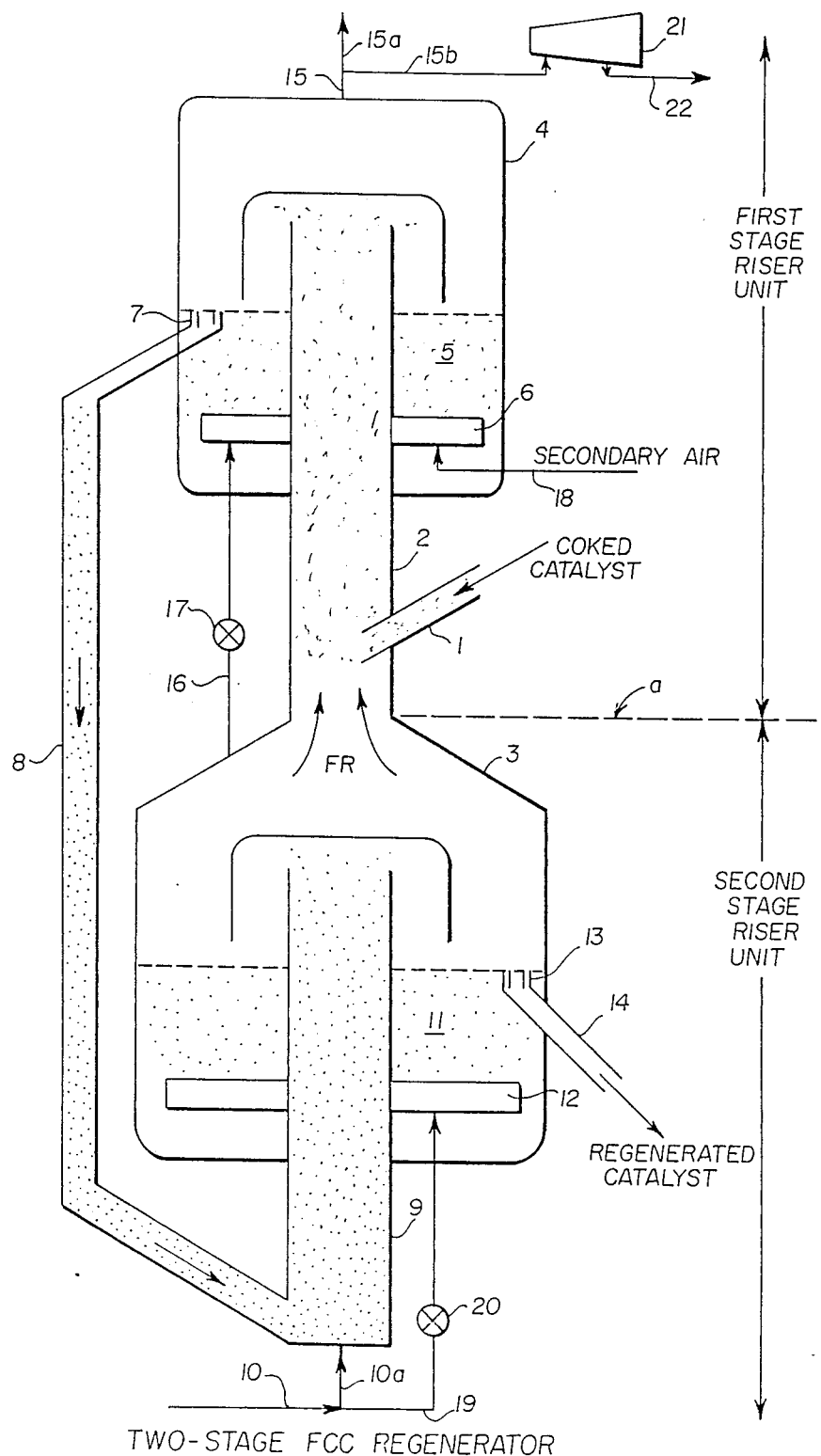
FIG. TWO-STAGE FCC REGENERATOR

APPARATUS AND METHOD FOR REGENERATING COKED FLUID CRACKING CATALYST

FIELD OF THE INVENTION

This invention is concerned with a counterflow, two-stage riser regenerator for regenerating coked cracking catalysts formed in a fluid catalytic cracking unit. It is further concerned with a method for regenerating coked fluid catalytic cracking catalysts formed in a fluid catalytic cracking unit, which method reduces the emission of one or more of the nitrogen oxides, sulfur oxides and carbon monoxide pollutants discharged with the flue gas.

BACKGROUND OF THE INVENTION

Fluid catalytic cracking, (hereinafter referred to as FCC), is a well-known petroleum process and need not be described herein in detail. Briefly, the FCC process is operated in a plant comprising a cracking unit that has a cracking zone operating in the absence of added hydrogen and a regenerator that has a regeneration zone designed to combust organic matter. Such plants contain a circulating inventory of solid acidic cracking catalyst which passes through the cracking zone where fresh feed such as a petroleum gas oil is converted to more useful products such as gasoline and fuel oil with concomittant formation of coked catalyst. The coked catalyst is usually stripped with steam to remove volatiles and then passes to the regenerator where the coke is removed by combustion with formation of a flue gas and regenerated catalyst which is returned in continuous fashion to the cracking zone. All references made herein to "coked FCC catalyst" are intended to refer to the catalyst after conventional steam-stripping. Many patents have issued concerned with one or more aspects of the FCC process, some of these dealing with process variations, others with hardware, and others with control of the process, including control of CO emmissions. Schwartz U.S. Pat. No. 4,159,239, is exemplary of such patents, and is incorporated herein by reference as if fully set forth.

Regenerators in FCC plants produce copious quantities of flue gas which are directly or indirectly discharged to the atmosphere. Because of the large scale that is characteristic of such plants, the environmental impact of the flue gas discharged is of considerable importance. In particular, the discharge of carbon monoxide in excessive quantities, as well as nitrogen oxides and oxides of sulfur have come under scrutiny and one or another of these have become the subject of restrictive legislation.

For convenience, the noxious oxides of nitrogen and sulfur will be referred to herein as $NO_x$ and $SO_x$, respectively, and the carbon monoxide as CO.

As much as half of the nitrogen and sulfur in the FCC feed is incorporated into the coke deposited on the catalyst in the FCC reactor. Upon regeneration of the catalyst, the incorporated nitrogen and the sulfur are burned off along with the coke to form $NO_x$ and $SO_x$ which are emitted in the flue gas from the regenerator. In addition, CO can be emitted in these gases as a result of incomplete combustion within the regenerator.

With the changing quality of crude oils available today, FCC feeds often have increased levels of nitrogen and sulfur (as high as 5000 ppm and 2.5%, respectively). These levels translate into regenerator $NO_x$ and $SO_x$ emissions which can be significantly higher than current or proposed limits set by governing municipalities. It is therefore likely that many FCC units will require some means to control such emissions.

In a typical single-stage regenerator, the operating parameter which most influences $NO_x$ and $SO_x$ emissions is the excess $O_2$ in the flue gas. Most problematic is that increasing the excess $O_2$, which is desirable to achieve a high degree of coke burnoff and CO conversion, greatly increases the emissions of both $NO_x$ and $SO_x$. However, it has been found previously that $SO_x$ emissions can be significantly reduced under excess $O_2$ conditions by incorporation of a "$SO_x$-transfer agent", such as alumina, or rare earths on alumina, with the FCC catalyst. The use of alumina for such purpose is described in Flanders et al., U.S. Pat. No. 4,115,251 the entire contents of which are incorporated herein by reference as if fully set forth. The use of rare earths on alumina is described in Bertolacini et al., U.S. Pat. No. 4,369,108 the entire contents of which are incorporated herein by reference. For these catalysts to perform well it is necessary to maintain a high level of excess $O_2$, typically more than 2 vol %, in the flue gas. For this reason, it has not been possible to achieve a simultaneous reduction in $NO_x$ when a $SO_x$ transfer agent is employed; in fact, $NO_x$ emissions usually increase.

Most FCC units now use zeolite-containing catalysts having high activity and selectivity. Zeolite-type catalysts have a particularly high activity and selectivity when the concentration of coke on the catalyst after regeneration is relatively low, such as below about 0.1 wt %, so that it is generally desirable to burn off as much coke as possible in regeneration. Thus, any solution to the flue gas emissions problem which involves the design or operation of the regenerator preferably should favor production of clean-burned regenerated catalyst.

The problem of carbon monoxide emissions has been addressed and a very widely accepted solution has been to include in the catalyst inventory a trace amount of a platinum group metal, as described in the above-cited Schwartz, U.S. Pat. No. 4,159,239 which promotes the combustion of carbon monoxide in a controllable manner in the dense-phase fluidized catalyst bed in the catalyst regenerator, the dense bed providing an adequate heat sink for recovery of process heat. The wide industrial acceptance of platinum promoted cracking catalysts lies not only with its effectiveness in reducing carbon monoxide emissions, but also because this mode of control fosters clean burning of the catalyst. This clean burning is effected in part because the recovered heat increases the catalyst bed temperature in a controlled fashion, and also because a high level of residual oxygen in the flue gas is permitted without danger of encountering afterburning. However, a problem encountered in some cracking operations using metal promoted, complete carbon monoxide combustion-type regeneration has been the generation of undesirable $NO_x$ in the flue gas. Thus, we see another incompatibility of the type in which the abatement of one pollutant, CO, leads to the aggravation of another pollutant, $NO_x$.

It is an object of the present invention to provide a novel concept FCC regenerator particularly well suited for the continuous regeneration of coked cracking catalyst formed in a FCC unit. It is a further object of this invention to provide a method for regenerating coked FCC catalyst and producing a regenerator flue gas having ecologically acceptable levels of $NO_x$. It is a still further object of this invention to provide a method for regenerating coked FCC catalyst with reduced emissions of any two or more of $SO_x$, $NO_x$ and CO.

These and other objects of this invention will become evident on reading this entire specification including the appended claims.

BRIEF DESCRIPTION OF THE DRAWING

The Figure Schematic Drawing of Two-Stage Regenerator.

SUMMARY OF THE INVENTION

This invention provides a novel, coupled two-stage regenerator particularly suited to the regeneration of hot coked cracking catalyst formed in a FCC unit, the formation of hot clean-burned catalyst being effected with markedly reduced emissions of one or more of $NO_x$, $SO_x$ and CO. The concept regenerator, briefly, consists of two riser units that are coupled in such a manner that hot coked catalyst from the FCC unit flows only into the first-stage riser unit, and from there to the second-stage riser unit, while fresh fluidizing gas comprising a predetermined amount of free oxygen flows into the second-stage unit and then passes to the first-stage unit, while regenerated catalyst is discharged from the second-stage unit and flue gas from the first stage unit, all as more fully described hereinbelow.

This invention also provides a novel method for regenerating hot coked cracking catalyst discharged from a FCC reactor. The method requires two stages of regeneration each of which stages produces a flue gas of distinct composition. The method comprises concurrently:

(a) passing said hot coked catalyst and first-stage fluidizing gas consisting of the second-stage flue gas containing more than 2 volume percent residual free oxygen and excessive $NO_x$ to a first-stage riser unit under conditions effective to burn off 10 to 50 percent of said coke whereby forming partially regenerated catalyst and a first-stage flue gas depleted of $NO_x$ and containing less than 2 volume percent of residual free oxygen;

(b) passing said partially regenerated catalyst and second-stage fluidizing gas consisting of fresh regenerating gas containing a predetermined content of free oxygen to a second-stage riser unit under conditions effective to produce regenerated catalyst and a second-stage flue gas containing more than 2 volume percent residual free oxygen and excessive $NO_x$;

(c) discharging said first-stage flue gas depleted of $NO_x$ from said first-stage riser unit; and (d) passing said regenerated catalyst back to said FCC reactor, all as more fully described hereinbelow.

In another embodiment of the process of this invention, hot coked fluid cracking catalyst that includes a $SO_x$-transfer component such as alumina is regenerated by the steps described above with entrainment of $SO_x$ in the regenerated catalyst and with reduced emissions of both $NO_x$ and $SO_x$.

In still another embodiment wherein the second-stage regeneration is conducted in a full CO-burning mode, reduced emissions of $NO_x$, $SO_x$ and CO are achieved.

DETAILED DESCRIPTION AND PREFERRED EMBODIMENTS

The Regenerator

The novel concept two-stage regenerator of this invention consists of two riser units of substantially conventional design, i.e. each unit consists of a vessel that contains a vertically extended riser pipe including its upper orifice. At or towards the bottom of the riser pipe are means such as a conduit for introducing a fluidizable solid and means for introducing and distributing fluidizing gas, such as a plenum and one or more conduits leading into the plenum and a distributor plate. In the usual operation, gas and solids are introduced by such means and form a dilute phase transport bed within the riser pipe, and this solid-gas dispersion is more or less rapidly discharged from the mouth of the riser pipe depending on the superficial velocity of the fluidizing gas and other recognized factors. Located within the vessel are catalyst-gas disengaging means such as one or more baffles and/or cyclones that effect separation of the suspended solid from the fluidizing gas, allowing the former to collect in the lower portion of the containment vessel and the latter in the upper portion. The upper portion is provided with one or more ports and/or conduits for removing the gas phase from the vessel, and the lower portion with a port or conduit for removing solids. For purposes of this invention, it is preferred that the lower portion of the containment vessel be provided with means for maintaining the separated solids as a dense fluidized bed. This is achieved, for example, by providing a suitably located distributor and conduit for introducing fluidizing gas.

The regenerator of the present invention is distinguished by the manner in which the two riser units are coupled. Although the riser units in general should be located in close proximity, they may be disposed horizontally, vertically, or in any modification thereof with respect to each other, since such disposition is not critical for present purposes, and may be dictated by cost, engineering or other considerations. However, the coupling of the two riser units must provide for the counterflow of solids and fluidizing gas between the two riser units, i.e. the transport of separated solids from the first-stage riser unit to the second-stage unit, and the transport of the separated gas phase from the second-stage riser unit to the first-stage unit and for its introduction into the first-stage unit as fluidizing gas. While transport of the gas phase is readily accomplished by simple conduits such as by pipes and by maintenance of a suitable pressure gradient regardless of the physical relationship of the two riser units, the transport of the separated solids between the stages, and between the regenerator and the FCC unit, however, will depend on whether or not gravity-assist is or is not available. For gravity-assist transport, seal-legs may be used; and, for transport of solids against gravity, gas lifts may be used.

As will be more fully described hereinbelow, the regenerator of this invention is particularly well-suited for the regeneration of coked fluid cracking catalyst. In particular, because of the way the two stages are coupled, the regenerator provides for the simultaneous maintenance of two different regeneration environments, one (the first stage) in which regeneration is conducted with a formation of a flue gas that contains very low levels of residual oxygen gas, and the other (second stage) in which the flue gas contains a more substantial amount of residual oxygen. The first stage of the regenerator also provides for the highly efficient contacting of coked and partially coked catalyst with the excessive $NO_x$ in the flue gas from the second stage, which is very effective for the destruction of the excessive $NO_x$ formed in the second stage. The second-stage environment is ideal for the complete combustion of CO to $CO_2$ and is a very favorable environment for entrapment of $SO_x$ when the coked FCC catalyst contains a $SO_x$-transfer agent. Thus, the two-stage regenerator substantially removes the limitations imposed by the environment of a conventional single-stage regenerator, wherein suppression of the formation of one contaminant aggravates the formation of another. Another advantage of the regenerator of this invention is that existing single-stage regenerators may be retrofitted with an additional stage to provide the novel regenerator with its attendant advantages.

The regenerator of this invention is contemplated as useful for other applications besides the regeneration of FCC catalysts. In catalyst manufacture, for example, it may be used for the large-scale calcining of fresh catalyst when the heat for such calcining is provided by burning a carbonaceous or hydrocarbon fuel mixed with the catalyst.

We will now describe a preferred embodiment of the regenerator of this invention and illustrate its use by reference to the Figure of the drawing.

Coked FCC catalyst from the FCC unit is introduced into riser pipe 2 of the regenerator via conduit 1. It is fluidized and moved upwardly through riser pipe 2 by the flue gas produced in the second-stage riser unit and discharged from vessel 3. The first-stage riser unit and the second-stage unit are delimited by the dashed line a as shown in the Figure. In the first-stage riser unit the catalyst carried by riser pipe 2 is disengaged from the fluidizing gas and forms a dense fluidized bed 5 of partially regenerated catalyst. The disengaged gas collects in vessel 4, fluidization by flue gas from vessel 3 passing via line 16 and valve 17 to sparger 6. The extent of regeneration (coke burnoff) that occurs in the first-stage riser unit is determined by the $O_2$ content of the flue gas produced in the second-stage riser unit. The $O_2$ content may be adjusted by adding secondary air via line 18 and sparger 6. The level of the dense fluidized bed 5 of partially regenerated catalyst is maintained constant by takeoff pipe 7 and the catalyst passed downwardly via seal leg 8 to riser pipe 9 where it is mixed with oxygen rich fluidizing gas (such as air) introduced via line 10 and 10a and carried over to the dense phase fluidized bed 11 in the second-stage riser unit, where fluidization is sustained by introduction of oxygen-rich gas introduced via line 19, valve 20, and sparger means 12. The level of the dense fluidized bed of regenerated catalyst 11 is maintained constant by takeoff pipe 13, and flows into standpipe 14 which returns the catalyst to the cracking unit. The separated flue gas containing more than 2 vol % oxygen in the upper part of vessel 3 flows from the second-stage riser unit via line 16 and riser 2, where it combines with secondary air introduced via sparger means 6 to form flue gas containing less than 2 vol % oxygen and is removed from the first-stage regenerator vessel 4 via line 15. The flue gas from line 15 is vented directly to the atmosphere via line 15a, or optionally passed via line 15b to expander 21 for recovery of sensible energy and then vented via line 22. A catalytic oxidation unit (not shown) may be interposed in line 15b should it be desirable to reduce the emission of combustible compounds, for example.

THE METHOD OF THIS INVENTION

The method of this invention is operable with any commercial FCC catalyst composition. Such catalyst comprises an inorganic, porous acidic cracking component such as silica-alumina, silica-magnesia or silica-zirconia. Most modern catalysts comprise a crystalline faujasite-like zeolite as cracking component in an amorphous matrix. Catalysts that contain zeolites are described, for example, in Plank et al., U.S. Pat. Nos. 3,140,249 and 3,140,253 the entire contents of these being incorporated herein by reference as if fully set forth. The method of this invention is particularly well suited for operation with catalyst compositions that contain a $SO_x$-transfer agent, such as alumina, as described hereinabove. Another component, which is optional, of the catalyst is a CO-combustion promoter, such as chromium, or a platinum group metal as described in Schwartz, U.S. Pat. No. 4,159,239 or Blanton, U.S. Pat. No. 4,290,878 the contents of which are incorporated herein by reference. It is preferred to operate the method of this invention with a catalyst that contains a trace amount of platinum since this favors the controlled conversion of CO in the second stage and the production of regenerated catalyst having a low residual carbon content. Finally, the method of this invention is well suited for operation with a "$NO_x$ reduction promoter", such as a catalyst composition which also incorporates Rh or Ir, as described in Blanton U.S. Pat. No. 4,290,878, herein incorporated by reference. The Rh or Ir catalyze the reduction of $NO_x$ by CO and thereby further enhance the removal of $NO_x$ and CO from the system. Such $NO_x$ conversion catalysts are particularly effective in promoting $NO_x$ reduction oh the low-oxygen environment of the first stage.

In the method of this invention, all of the hot coked FCC catalyst is passed to a first-stage riser unit operated under conditions effective to remove about 10 wt % to 50 wt % (based on wt % carbon on catalyst) of the coke and to produce a flue gas that contains less than about 2 vol % of residual oxygen gas, and preferably less than 1.5 vol %. As will be shown hereinbelow, partially regenerated catalyst in an environment of low excess oxygen is effective in reducing the emission of $NO_x$. Since all of the flue gas discharged by the regenerator is discharged from the first-stage riser unit, the $NO_x$ emissions from the regenerator are maintained at a low level.

All of the partially regenerated catalyst produced in the first stage is passed to the second stage where it is contacted with fresh fluidizing gas, such as air, to form regenerated catalyst and a flue gas that contains more than about 2 vol % of excess oxygen. Such an environment of relatively high excess oxygen favors rapid regeneration, the formation of clean-burned catalyst, the suppression of $SO_x$ formation in the presence of a $SO_x$-transfer agent, and the substantially complete burning of CO to $CO_2$. Although complete CO-burning may occur in the absence of a combustion promoter such as chromium or a platinum group metal, it occurs in a controlled fashion in the dense fluidized bed of the second-stage riser unit when such a promoter is present, and its presence also suppresses afterburning.

The gaseous environment of the second-stage unit, which suppresses the formation of CO and/or $SO_x$, favors the formation of excessive concentrations of $NO_x$. However, since much of the $NO_x$ is destroyed in the first stage, it is evident that the two stages cooperate with each other to simultaneously control CO, $NO_x$ and $SO_x$ emissions in a manner heretofore not achievable.

The method of this invention requires control of process parameters for each of the two units. As will be recognized by one skilled in the art, the interaction of bed temperature, catalyst residence time, the gas flow rate and the concentration of gaseous oxygen in the fluidizing gas introduced to each stage determine the amount of carbon burned and the concentration of excess oxygen in the flue gas for that stage. For purposes of the present invention, all of the foregoing parameters, with the exception of the concentration of excess oxygen in the flue gas, may have any of their conventional values. These values, however, are chosen in such combination as to limit the coke removal in the first stage to not more than 50%, preferably in in the range of 10 to 40%, and most preferably in the range of 10 to 30%, and to provide flue gases for the two stages that have distinctly different contents of excess oxygen.

Experimental observations will now be described that illustrate the importance of the content of excess $O_2$ in the flue gas in controlling noxious emissions. These observations are not intended to limit the scope of the invention, which scope is determined by the entire specification and appended claims.

Experimental

All experiments were performed with a commercial, coked equilibrium catalyst having the approximate composition:

| | |
|---|---|
| C (wt %) | 0.73 |
| N (ppm) | 305 |
| Pt (ppm) | 1.49 |
| Ni (ppm) | 950 |
| V (ppm) | 880 |
| Cu (ppm) | 25 |

Experiments were carried out at 650° and 700° C. in a continuous fluidized bed unit. 400 cc/min of a nitrogen gas containing 170 ppm by volume of NO was used as a fluidizing gas and passed through a 10 g bed of coked catalyst. NO was chosen to represent $NO_x$ in these experiments since it is known that NO accounts for almost all ( 97%) of the $NO_x$ emitted from FCC regenerators. For reference, the gas flow rate corresponded to a WHSV of 2.8 hr-1, similar to that in commercial use.

Identical runs were carried out with fluidizing gas which contained 0.75 vol % CO and 0.75 vol % $CO_2$ in addition to 170 ppm NO. Baseline runs were performed using beds of both clean sand and clean-burned FCC catalyst having less than 0.04 wt % carbon residue. Steady state inlet and outlet NO concentrations were measured using a Beckman Model 951A chemiluminescent $NO_x$ analyzer.

The results of the experiments, summarized in Table I, show that the reaction of NO with carbon is an important route to NO destruction under $O_2$-starved conditions. In contrast, the competitive reaction of NO with CO does not contribute to its removal from the system under the same conditions. The data clearly show that substantial reduction of NO occurs over the coked catalyst when no CO is present, e.g. 51% at 700° C. Moreover, no additional NO reduction is observed when 0.75 vol % CO is added. Negligible conversion occurs under any circumstance with clean sand, while the clean-burned catalyst shows only a small (11%) reduction of NO in the presence of CO.

In summary, the collective results demonstrate that contacting of $NO_x$ and coked catalyst can lead to significant $NO_x$ removal within an FCC regenerator environment.

TABLE I

| | | | | | |
|---|---|---|---|---|---|
| Inlet Gas Mix A: | 170 ppmv NO, balance $N_2$ | | | | |
| Inlet Gas Mix B: | 170 ppmv NO, 0.75% CO, 0.75% $CO_2$, balance $N_2$ | | | | |
| | | Outlet NO Conc. (ppmv) | | % NO Removal | |
| Bed | Temp. °C. | A | B | A | B |
| Coked FCC Catalyst | 650 | 118 | 118 | 30 | 30 |
| | 700 | 84 | 84 | 51 | 51 |
| Clean-Burned | 650 | 168 | 151 | 1 | 11 |
| FCC Catalyst | 700 | 173 | 152 | 0 | 11 |
| Clean Sand | 650 | 166 | 168 | 2 | 1 |
| | 700 | 164 | 163 | 4 | 4 |

Another series of experiments were performed in which the catalyst was regenerated in a continuous steady-state mode and with different levels of excess $O_2$ in the flue gas. The coked catalyst examined in this study was similar to that described above but it contained 0.86 wt % carbon and 370 ppm nitrogen. Regenerations were carried out at 3 to 4 psig at 650° and 700° C. Inlet $O_2$ concentrations were varied from 1.5 to 12 vol % by appropriately mixing $N_2$ and air as the inlet fluidizing gas. The total inlet gas flow rate was maintained constant at 400 cc/min. Catalyst feed rates to the reactor were varied from 0.62 to 1.87 g/min, corresponding to average catalyst residence times of about 16 to about 5 minutes. Typical $H_2O$ partial pressures corresponded to about 3 to about 4 vol % with several runs having additional $H_2O$ injected into the reactor to give about 10 to about 11 vol % $H_2O$. The results of these regenerations are summarized in Table II in terms of the observed steady state selectivities for $NO_x$ emissions and the corresponding overall coke N conversions are as follows:

TABLE II

| Excess $O_2$ (vol %) | C Burnoff (%) | Selectivity for $NO_x$ Emission g $NO_x$/gC | Coke N Conversion to $NO_x$ (%) |
|---|---|---|---|
| less than 1 | less than 70 | less than 0.005 | less than 5.4 |
| more than 1 | more than 70 | 0.025 to 0.030 | 27 to 33 |

As can be seen from Table II, operation with low excess oxygen drastically reduces $NO_x$ emissions. The results were found to be insensitive to the partial pressure of steam.

What is claimed is:

1. A continuous counterflow two-stage method for regenerating hot coked FCC catalyst discharged from a FCC reactor, each of which stages produces a distinct flue gas, said FCC catalyst comprising an acidic cracking component and a $SO_x$-transfer agent, which method comprises as concurrent steps:

passing said hot coked catalyst and first-stage fluidizing gas containing all of the second-stage flue gas having more than 2 volume percent residual free oxygen and an ecologically excessive concentration of $NO_x$ to a first-stage riser unit under conditions effective to burn off 10 to 50 percent of said coke whereby forming partially regenerated catalyst and a first-stage flue gas depleted of $NO_x$ and containing less than 2 volume percent of residual free oxygen;

passing said partially regenerated catalyst and second-stage fluidizing gas consisting of fresh regeneration gas to a second stage riser unit under conditions effective to produce regenerated catalyst containing entrained $SO_x$ and a second-stage flue gas containing more than 2 volume percent of residual free oxygen and an ecologically excessive concentration of $NO_x$;

discharging said first-stage flue gas depleted of $NO_x$ from said first-stage riser unit; and passing said regenerated catalyst containing entrained $SO_x$ back to said FCC reactor.

2. The method described in claim 1 wherein said FCC catalyst contains a platinum-group metal CO-oxidation promoter and said second-stage unit is operated in the complete CO-combustion mode.

3. The method described in claim 2 wherein said FCC catalyst also contains a $NO_x$-reduction promoter.

4. The method described in claim 1 including the step of passing the catalyst from the second stage riser to a dense bed in said second-stage riser unit.

5. The method described in claim 4 wherein said FCC catalyst contains a platinum-group metal CO-oxidation promoter and said second-stage unit is operated in the complete CO-combustion mode.

6. In a fluid-bed method for regenerating hot coked FCC catalyst in 2 stages by contact with a gas containing elemental oxygen, the improvement whereby the emission of pollutants discharged with the flue gas is abated, which comprises:

(a) intimately and thoroughly mixing in a first stage riser unit hot coked FCC catalyst and the second-stage flue gas including containing $NO_x$ passed in step (d), said mixing being under conditions effective to burn off 10 to 50 percent of said coke whereby forming a first combustion zone flue gas having a lower $NO_x$ content than said second combustion zone flue gas and less than 2 volume percent of residual free oxygen;

(b) discharging from the regenerator said first stage flue gas;

(c) passing said partially regenerated catalyst from step (a) to a second stage riser unit wherein said catalyst is contacted with fresh regenerating gas under conditions effective to form completely regenerated catalyst and a second stage flue gas containing $NO_x$ and more than 2 volume percent of residual free oxygen;

(d) passing all of said second stage flue gas to said first stage and passing said completely regenerated catalyst back to said FCC reactor.

7. The method described in claim 6 including the step of passing the catalyst from the second stage riser to a dense bed in said second stage riser unit.

8. The method described in claim 7 wherein 10 to 40 percent of said coke is burned in said first combustion zone.

9. The method described in claim 7 wherein 10 to 30 percent of said coke is burned in said first combustion zone.

10. The method described in claim 6 wherein said FCC catalyst contains a platinum group metal combustion promoter, and said second CO-combustion zone is operated in the complete CO-burning mode.

11. The method described in claim 8 wherein said FCC catalyst contains a platinum group metal combustion promoter, and said second combustion zone is operated in the complete CO-burning mode.

12. The method described in claim 9 wherein said FCC catalyst contains a platinum group metal combustion promoter, and said second combustion zone is operated in the complete CO-burning mode.

* * * * *